United States Patent [19]
Schoppee

[11] 3,795,302
[45] Mar. 5, 1974

[54] ARTICLE FEEDER FOR WRAPPING MACHINE OR THE LIKE

[75] Inventor: Lawrence W. Schoppee, Springfield, Mass.

[73] Assignee: Package Machinery Company, East Longmeadow, Mass.

[22] Filed: Oct. 26, 1971

[21] Appl. No.: 192,443

[52] U.S. Cl.................. 198/25, 198/34, 198/156, 198/211
[51] Int. Cl. ... B65g 47/32, B65g 47/52, B65g 29/00
[58] Field of Search..... 198/25, 137, 156, 157, 209, 198/34, 211

[56] References Cited
UNITED STATES PATENTS

| 3,521,513 | 7/1970 | Gomann et al. | 198/25 X |
| 890,250 | 6/1908 | Thompson | 198/25 X |
| 2,582,623 | 1/1952 | Douglas | 198/209 X |
| 2,884,114 | 4/1959 | Oberwelland | 198/24 |
| 3,352,403 | 11/1967 | Blake | 198/34 |
| 3,572,495 | 3/1971 | Luginbuhl | 198/34 |
| 3,469,671 | 9/1969 | Mencacci et al. | 198/25 |

Primary Examiner—Evon C. Blunk
Assistant Examiner—James W. Miller
Attorney, Agent, or Firm—McCormick, Paulding & Huber

[57] ABSTRACT

A rotary feeder or transfer mechanism which is driven and which includes a circumferential series of flights adapted to lift one or a selected number of articles from the front of a packed line of such articles being advanced by a first conveyor and to deposit the one or selected number of articles as a unit on the inlet end of a second conveyor whereupon such unit is further advanced by the second conveyor separated from the next such unit.

7 Claims, 9 Drawing Figures

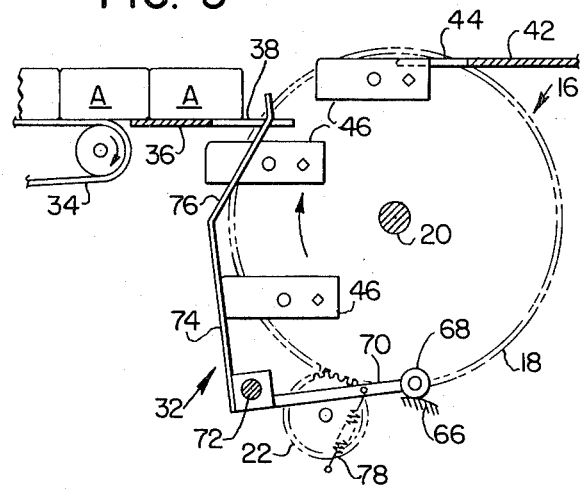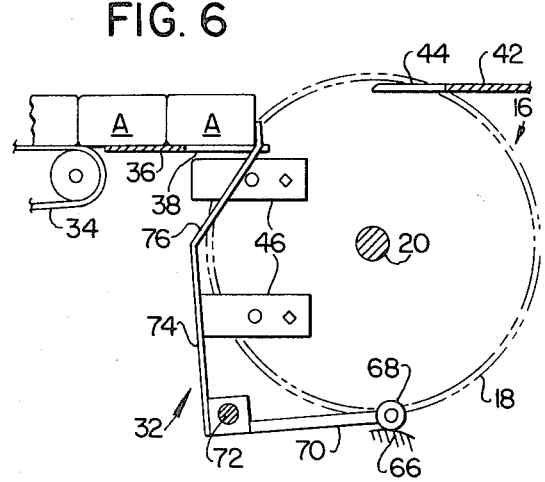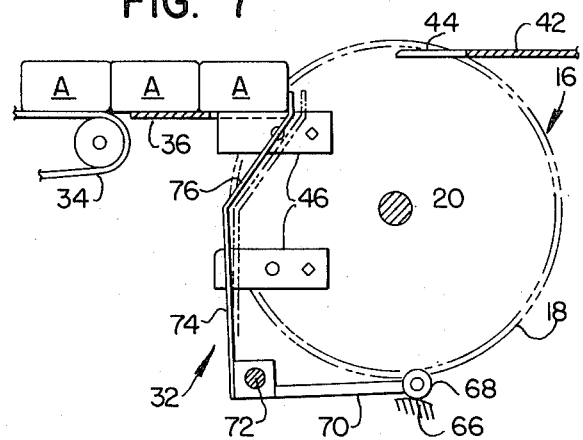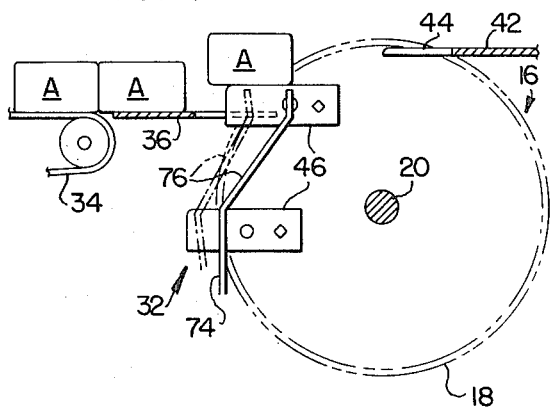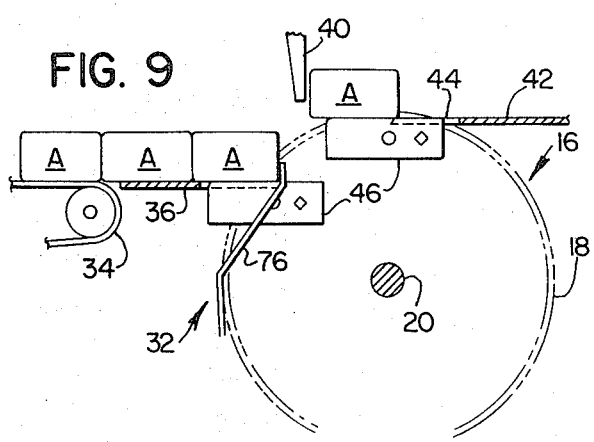

ARTICLE FEEDER FOR WRAPPING MACHINE OR THE LIKE

BACKGROUND OF THE INVENTION

The aforesaid feeder mechanism can find use in many environments wherein produced articles are being moved along in abutting relationship but must be separated for further processing. One particular use for the invention occurs in feeding wrapping machines wherein one or more articles, such as candy bars, must be fed to the wrapping machine as a unit separate from other such units, but the production line of such bars does not provide for separation of them. In most prior wrapping machine feeder mechanisms, the production line of bars being advanced on a conveyor has been brought to a full stop for each unit being fed. Such mechanisms have not been entirely satisfactory and are subject to much wear and tear caused by the start and stop inertia.

SUMMARY OF THE INVENTION

The feeder provided in accordance with the present invention features the use of a rotary frame disposed between the discharge end of a first conveyor and the inlet end of a second conveyor. The first conveyor or conveyor means for advancing the articles in abutting relationship includes a first pronged deadplate at its discharge end, and the second conveyor has a second pronged deadplate at its inlet end. The driven rotary frame of the feeder supports a plurality of article transfer flights in sets which are spaced in a circumferential series around the axis of the frame. Preferably, there are at least two such flights in each set arranged to straddle a prong on each of the deadplates as the frame is rotated, but a single bifurcated flight will serve the same purpose. A leveling means interconnects all of the flights to maintain them preferably in substantially horizontal position, or in any other desired position, so that each set of flights will engage and lift one or any selected number of articles off the first deadplate in a desired way for deposit as a unit on the second deadplate during frame rotation. A cam operated stop is moved into an initial position for engagement by the foremost article on the first deadplate to move with it while positioning a unit for engagement by a flight set. The stop is moved out of engagement with the foremost article as the unit is lifted by a flight. The stop then is returned to its initial position. A common drive is utilized for the rotary frame and the stop so as to time a cycle of stop operation as each set of flights is associated with the first deadplate to pick up a unit of articles therefrom. The stop includes at least one finger which is the portion of the stop actually engaged by the foremost article in the advancing line. The stop, while it moves with the line of advancing articles on the first conveyor deadplate is not moved at the same rate of speed, the stop being slightly slower. However, the rate of advance of the articles is not substantially retarded, being retarded only enough to assure that the foremost article or articles are positioned by the stop finger or fingers for accurate and proper pick-up as a unit by a flight on the rotary frame.

BRIEF DESCRIPTION OF THE DRAWINGS

FIGS. 5–9 are similar schematic views which portray the operation of the feeder through a full cycle of stop movement.

DESCRIPTION OF THE PREFERRED EMBODIMENT

Figure 1:
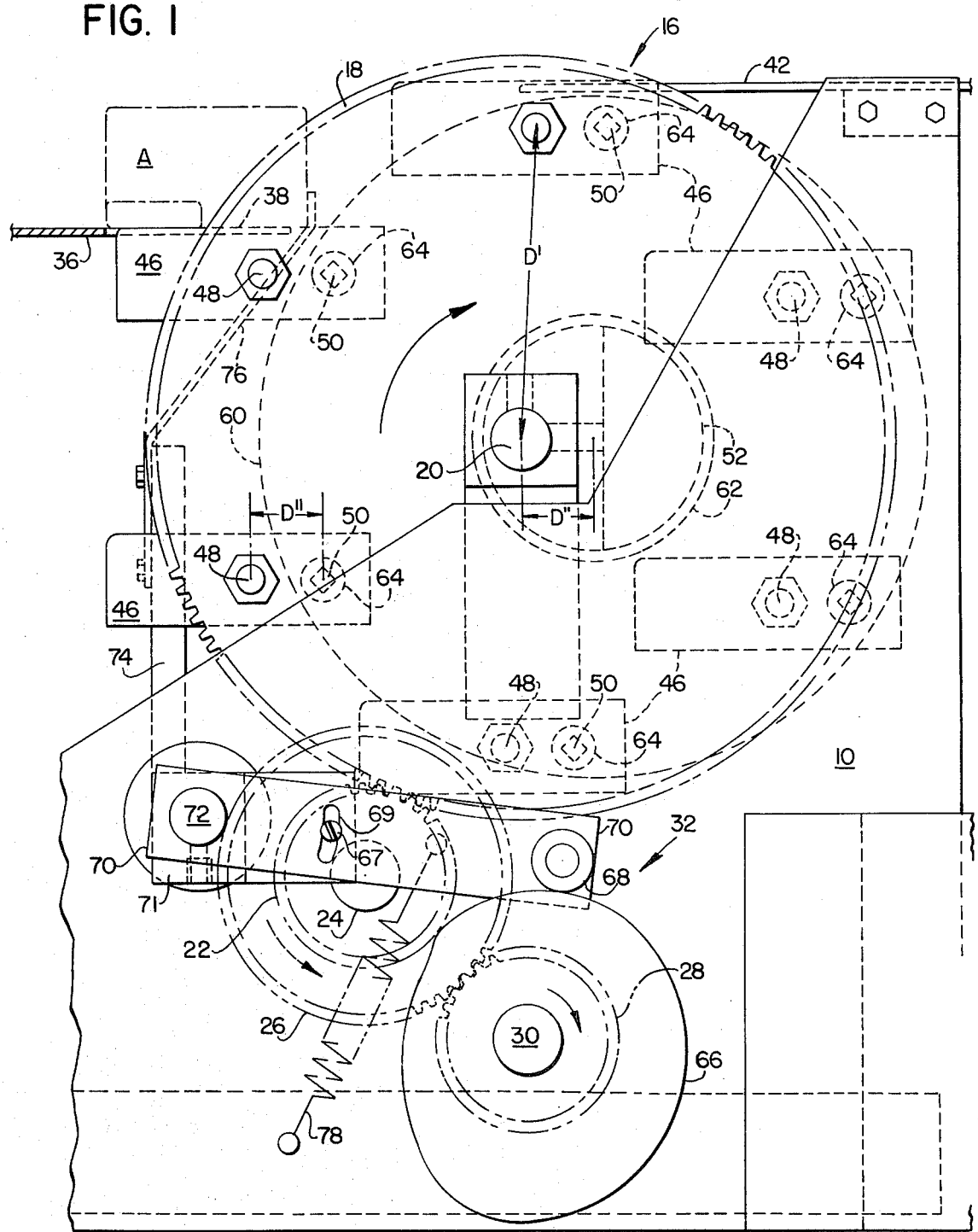
FIG. 1 is a front elevational view of the feeder mechanism provided in accordance with the present invention so as to illustrate the use of the feeder in moving articles off a first conveyor on the left and onto a second conveyor on the right.
Figure 2:
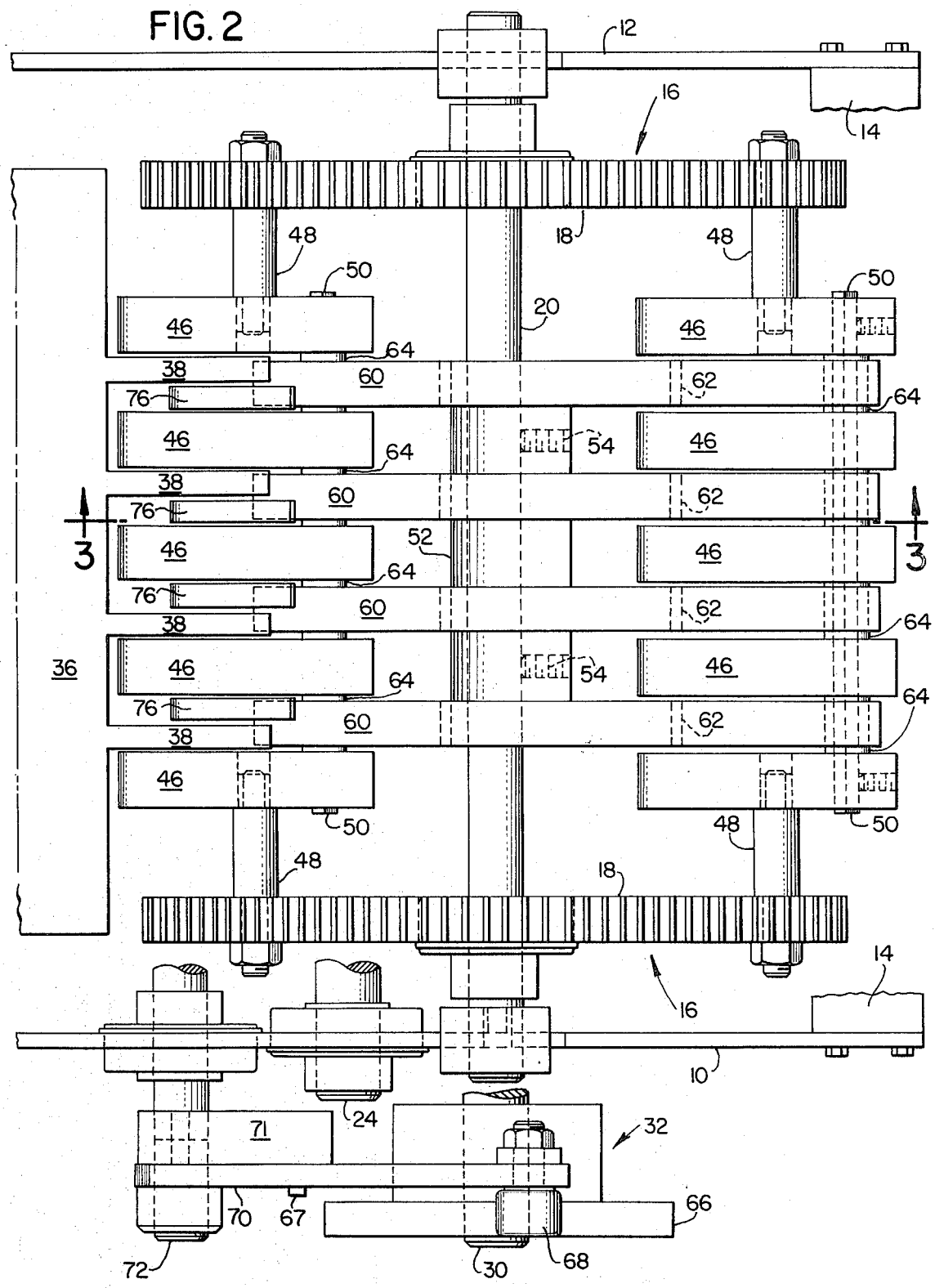
FIG. 2 is a top plan view of the feeder mechanism shown in FIG. 1.

As seen in FIGS. 1 and 2, the feeder mechanism provided in accordance with the present invention is supported between fixed front and rear vertical plates 10 and 12, respectively, and one or more crossbars 14 are utilized to complete the fixed frame structure. In addition to the fixed frame, the feeder features a driven rotary frame which is indicated generally by the reference number 16. The driven rotary frame 16 has as principal components a pair of relatively large gears 18, 18 which are rotatably mounted on a horizontal support shaft 20. The support shaft 20 is fixedly mounted on the front and rear fixed frame plates 10 and 12 and the gears 18, 18 are rotatable on said shaft in positions wherein one such gear is near the front plate 10 and the other such gear is near the rear plate 12.

The gears 18, 18 and thus the rotary frame 16 are driven by pinions 22 secured to a driven drive shaft 24 (FIG. 1) which is shown to extend between the front and rear frame plates 10 and 12 and to be journaled therein below and to the left of the rotary frame 16. Another pinion 26 is secured to the drive shaft 24 to mesh with a gear 28 secured on a cam shaft 30 which projects forwardly from the front fixed frame plate 10 to operate a movable stop mechanism indicated generally in FIG. 2 by the reference number 32.

As has been mentioned, the feeder of this invention is adapted to move as a unit one or more articles A off the discharge end of a first conveyor wherein the articles are being advanced usually in a packed condition or abutting relationship onto the inlet end of a second conveyor wherein the articles are to be further advanced, but as separated units. As shown in FIGS. 5–9 the first conveyor 34 may be an endless belt conveyor which advances the articles A, A by line pressure onto a first deadplate 36 having prongs 38, 38 spaced along its discharge or right-hand edge. As shown in FIG. 9, the second conveyor may comprise an overhead flight bar conveyor having flight bars such as shown at 40 which will engage each article unit A after it has been deposited on a second deadplate 42 having a series of prongs 44, 44 spaced along its inlet or left-hand edge. As will be seen in FIGS. 5–9, the first deadplate 36 associated with the first conveyor 34 is at a lower elevation than the second deadplate 42 associated with the second conveyor and each article unit A is lifted off the first deadplate at its right-hand edge and deposited on the second deadplate along its left-hand edge.

Figure 3:
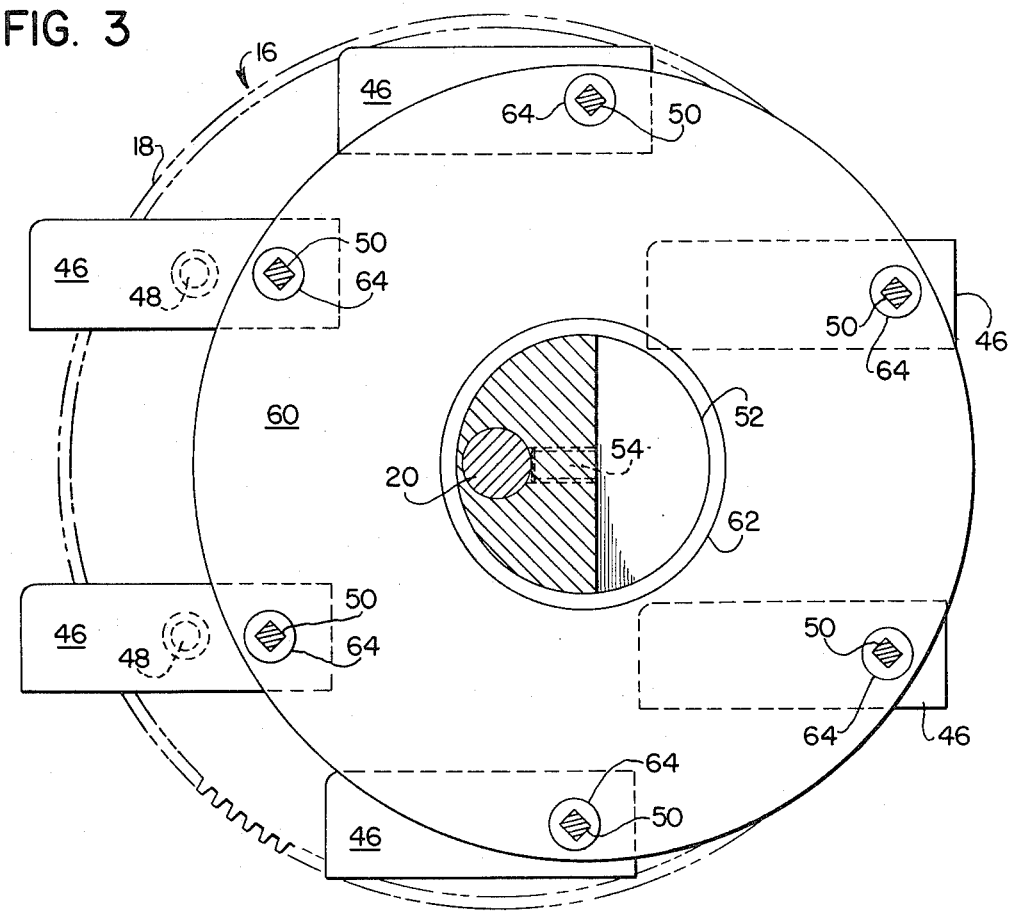
FIG. 3 is a cross-sectional view taken in a vertical plane through the feeder mechanism as indicated generally by the line 3—3 in FIG. 2.

Means employed in the rotary feeder frame 16 for lifting and transferring the article units A comprise a plurality of flights 46 which are arranged in sets disposed in circumferential series in radially spaced relationship to the axis of the support shaft 20. More specifically, and as best shown in FIG. 2, there are five of the flights 46 in each set, the flights in each set being spaced apart on a line parallel to the support shaft 20 and with the front and rearmost flight in each set being rotatably supported on a support pin 48 which is secured to and projects inwardly from the front gear 18 for the front flight 46 and from the rear gear 18 for the rear flight 46. As seen in FIGS. 1 and 3, the support pins 48, 48 for the sets of flights 46, 46 are all equally spaced the same radial distance D' from the axis of the support shaft 20, and it will also be seen that the support pins are equally circumferentially spaced from each other to provide a circumferential series of six sets of flights.

The front and rear flights 46 in each set are connected together and to the three intermediate flights in the set by means of a horizontally disposed connecting rod or leveling pin 50 which has a rectangular cross-section as seen in FIGS. 1 and 3. The leveling pin 50 is located in the flights 46 to prevent rotation or movement thereof from a substantially horizontal position as will be described hereinafter, and in this connection, the center line or axis of each pin 50 is located a predetermined distance D'' (FIG. 1) from the center line or axis of the support pin 48 with which it is associated in a set of flights. Due to the rectangular cross-section of each leveling pin 50 being received in a complementary rectangular opening in each flight 46, the said flight is unable to be rotated relative to the leveling pin, but it is free to rotate relative to the flight support pin or pins 48.

As can best be seen in FIG. 2, the five flights 46 in each set are arranged and spaced so that adjacent flights in the set will straddle one of the four prongs 38 on the first deadplate 36 as the frame 16 is rotated. They will similarly straddle four prongs 44 on the second deadplate 42. Thus, as the flights are elevated past the first deadplate 36 the article unit A is lifted off that deadplate and as the set of flights pass the second deadplate 42 the article unit is deposited on it. It is, of course, desirable that the flights in the set remain in a substantially horizontal position during rotation of the frame 16 and the leveling pins 50 are employed for this purpose in association with the additional leveling mechanism which will now be described.

Figure 4:
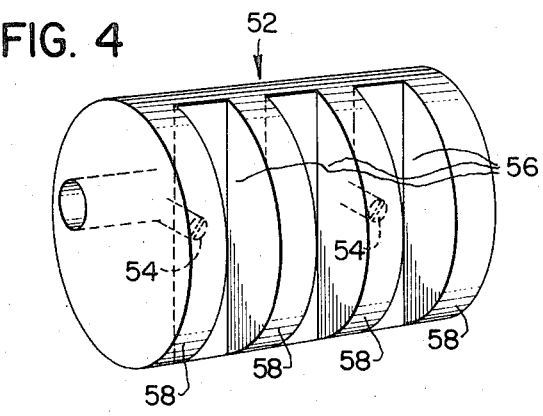
FIG. 4 is a perspective view of the hub utilized in the rotary frame to support the leveling means which keeps all of the flights in parallel relationship during rotation of the rotary feeder frame.

The said leveling mechanism includes a hub 52 (FIG. 4) which is eccentrically mounted on the support shaft 20 with its center or axis spaced from the axis of the support shaft by the said distance D'' and in the same direction that the axis of the leveling pins 50 are spaced from the axis of the support pins 48. The hub 52 is secured to the support shaft 20 as by set screws 54 (FIG. 2) and it will be seen in FIG. 4 that segments 56 are slashed or cut from the hub 52 to permit the three intermediate flights 46 in each set to pass through the segmental cut portions of the hub as the sets of flights are lowered from association with the second deadplate 42. The four uncut portions 58 of the hub 52 mount an axially spaced apart series of four leveling discs 60 on bushings 62. That is, the leveling discs 60 are free to rotate about the axis of the hub 52 and thus, they rotate relative to the support shaft 20.

As seen in FIGS. 1, 2 and 3, each leveling disc 60 carries a circumferential series of six bearing units 64 which receive the six leveling pins 50 and which are rotatable in the discs. The axis or center line of each leveling pin 50 and bearing unit 64 is radially spaced from the axis of the hub 52 the same distance D' that the axis of each support pin 48 is spaced from the axis of the support shaft 20. Therefore, when the rotating frame 16 is driven and the gears 18, 18 are rotated relative to the support shaft 20, the discs 60, 60 are similarly rotated on the axis of the hub 52 and by means of their connection through the leveling pins 50, 50 to the flights 46, 46, all such flights are maintained parallel to each other and preferably in a substantially horizontal position as shown during their rotation with the frame 16.

The stop mechanism 32 referred to previously is utilized to engage and position the foremost article unit A on the first deadplate 36 for proper pick up by a set of flights. The said stop mechanism includes a cam 66 (FIGS. 1 and 2) which is secured to the shaft 30 for rotation therewith. Thus, the cam driven stop mechanism 32 is operated in timed relationship with the rotation of the feeder frame 16 by means for their common drive. The periphery of the cam 66 is engaged by a follower roller 68 projecting from an arm 70 which is secured by means of a block 71 for rotation with a shaft 72 at its front end, said shaft 72 being disposed horizontally and journaled in the front and rear frame plates 10 and 12 below and to the left of the rotary frame 16. Thus, as the cam 66 is rotated, the arm 70 is pivoted or oscillated to pivot the shaft 72 clockwise and counterclockwise on its axis.

The connection of the arm 70 with the shaft 72 is adjustable. That is, the arm 70 is actually connected by means of a screw 67 extending through an arcuate slot 69 in the arm to the block 71 which is fixed to the shaft. By adjusting the relative position of the arm 70 on the block 71 about the axis of the shaft 72, the rotated positions of the shaft caused by cam operation can be adjusted.

The shaft 72 has four other arms 74 secured to it in spaced relationship along its length and each arm 74 mounts a finger 76 at its upper end. Each finger 76 is arranged to be disposed between two flights 46 and adjacent a prong 38 in an adjusted initial position of the stop mechanism when a set of flights approaches the first deadplate 36. The adjustment of the stop position is, of course, affected by adjustment of the arm 70 relative to the shaft 72 as described. This initial position of the stop mechanism 32 and of the finger 76 is shown in FIG. 5.

In this initial position of the stop mechanism and stop fingers, if the foremost article is of sufficient length, it will engage all of the stop fingers 76 being employed. Then, as the cam 66 continues to rotate in timed relationship to the rotation of the feeder frame 16, the roller 68 remaining in engagement with the cam 66 by means of a spring 78 connected between the arm 70 and the fixed frame, the stop mechanism will pivot clockwise as viewed in FIGS. 5–9 so that the stop fingers 76 will move with the advancing line of articles from the first conveyor 34. However, this movement of the stop mechanism does not move the stop fingers 76 at the same rate of advance of the articles, the stop fingers being slower. This permits the finger or fingers properly to position the foremost article unit A for pick up by a set of flights as depicted in FIGS. 6 and 7. However, the rate of advance of the line of articles is not substantially retarded. Then, as the foremost article unit A is lifted by a set of flight bars as shown in FIG. 8, the fingers are moved by the cam operated stop mechanism to disengage the said unit and to return to the initial position shown in FIG. 5. In the meantime, the foremost article unit A being carried by a set of flight bars is moved upwardly and in a clockwise direction so that it will be deposited on the second deadplate 42 as shown in FIG. 9 for pickup by the overhead flight bar 40 in the second conveyor structure. Thus, each article unit being fed to the feeder mechanism on the first conveyor 34 is separated for separate handling by the second conveyor.

I claim:

1. A feeder for removing a selected number of articles from the front of a line of such articles being advanced by a first conveyor on which the articles may be abutting and for transferring them to a second conveyor for further advancing the articles as separated units having the selected number in each unit, the first conveyor having a first pronged deadplate at its discharge end and the second conveyor having a second pronged deadplate at its inlet end, and the said feeder comprising a driven rotary frame supporting article transfer flights in sets which are spaced in a circumferential series around the axis of the frame, there being at least two such flights in each set arranged to straddle a prong on each of the deadplates as the frame is rotated, a leveling means interconnecting all of the flights to maintain them in substantially parallel relationship and generally horizontally disposed so that each set of flights will engage and lift a unit of articles off the first deadplate and deposit it on the second deadplate during frame rotation, a cam operated stop movable into an initial position for engagement by the foremost article on the first deadplate to move with it while positioning a unit for engagement by a flight set, the stop being moved out of engagement with the foremost article and returned to its initial position as the unit is being lifted, and a common drive for said rotary frame and stop adapted to time the aforesaid operation of the stop for each set of flights.

2. A feeder as defined in claim 1 wherein the stop includes at least one finger which is disposed between flights in a set and adjacent a prong on the first deadplate for engagement by the foremost article in the initial position of the stop, and wherein the rate of movement of the stop with the foremost article is less than the rate of advance of the articles by the first conveyor, but such rate of advance is not substantially retarded.

3. The feeder as defined in claim 1 wherein the rotary frame comprises a pair of relatively large driven gears rotatably mounted in spaced relationship on a support shaft, and the respective transfer flights in each set are rotatable on support pins carried by the respective gears parallel to the support shaft and in equal radial spacing therefrom.

4. The feeder of claim 3 wherein the leveling means includes a hub eccentrically secured to said support shaft with its axis a predetermined distance from the axis of the support shaft, a disc rotatable on said hub and carrying leveling pins parallel to the support shaft and hub and spaced radially from the hub axis the same distance as the radial spacing of the support pins from the axis of the support shaft, and each leveling pin being employed to connect the transfer flights in a set by being rotatably secured thereto on an axis spaced from the axis of the support pins for such set by the same predetermined distance and in the same direction that the axis of the hub is spaced from the axis of the support shaft.

5. The feeder defined in claim 4 wherein the stop includes at least one finger which is disposed between flights in a set and adjacent a prong on the first deadplate for engagement by the foremost article in the initial position of the stop, and wherein the rate of movement of the stop with the foremost article is less than the rate of advance of the articles by the first conveyor, but such rate of advance is not substantially retarded.

6. A feeder for removing a selected number of articles from the front of a line of such articles being advanced by a first conveyor and for transferring them to a second conveyor for further advancing the articles as separated units with the selected number in each unit, the said feeder comprising a driven rotary frame supporting article transfer flights in a circumferential series around the axis of the frame, the rotary frame comprising at least one relatively large driven gear rotatably mounted on a support shaft, and the transfer flights being rotatable on support pins carried by said gear parallel to its support shaft and in equal radial spacing therefrom, a leveling means associated with all of the flights to maintain them in substantially parallel relationship and in generally horizontal disposition during frame rotation, the first and second conveyors and the flights being constructed and arranged so that each flight can engage and lift the selected number of articles as a unit from the discharge end of the first conveyor and deposit such unit on the inlet end of the second conveyor, a cam operated stop movable into an initial position for engagement by the foremost article on the first conveyor to move with it while positioning it for engagement and lift by a flight, the stop being moved out of engagement with said foremost article and returned to its said initial position as each unit is being lifted, and a common drive for said rotary frame and stop adapted to time the aforesaid operation of the stop for each flight.

7. The feeder mechanism set forth in claim 6 wherein the leveling means includes a hub eccentrically secured to said support shaft with its axis a predetermined distance from the axis of the support shaft, a disc rotatable on said hub and carrying leveling pins parallel to the axes of the support shaft and hub and spaced radially from the hub axis the same distance as the radial spacing of the support pins from the axis of the support shaft, and each leveling pin being rotatably secured to a transfer flight on an axis spaced from the axis of the support pin for such flight by the same predetermined distance and in the same direction that the axis of the hub is spaced from the axis of the support shaft.

* * * * *